United States Patent

Otani et al.

[11] Patent Number: 5,697,206
[45] Date of Patent: Dec. 16, 1997

[54] ROLLED PART FOR CHAIN AND MANUFACTURING METHOD THEREFOR

[75] Inventors: Tomofumi Otani, Suita; Sachihiko Maeda, Hirakata; Shuji Sasamoto, Toyonaka; Masaharu Tamaki; Takero Nakagawa, both of Osaka; Yoshitaka Yoshimura; Hiroshi Kobayashi, both of Ashiya, all of Japan

[73] Assignee: Tsubakimoto Chain Co., Osaka, Japan

[21] Appl. No.: 595,997

[22] Filed: Feb. 6, 1996

[30] Foreign Application Priority Data

Feb. 7, 1995 [JP] Japan ................... 7-041400
Jan. 23, 1996 [JP] Japan ................... 8-009488

[51] Int. Cl.⁶ .......................... B21L 9/02; F16G 13/06
[52] U.S. Cl. ................... 59/4; 59/35.1; 29/898.1; 384/283
[58] Field of Search .................. 59/4, 5, 6, 7, 8, 59/35.1; 29/898.054, 898.056, 898.057, 898.1, 898.13; 384/283, 284, 291

[56] References Cited

U.S. PATENT DOCUMENTS

| | | | |
|---|---|---|---|
| 1,113,754 | 10/1914 | Clemens | 384/283 |
| 1,597,428 | 8/1926 | Brincil | 384/284 |
| 1,722,861 | 7/1929 | Renshaw | 59/35.1 |
| 1,746,020 | 2/1930 | Whiteley | 384/284 |
| 1,925,055 | 8/1933 | Mize | 59/5 |

FOREIGN PATENT DOCUMENTS

| | | | |
|---|---|---|---|
| 119898 | 9/1984 | European Pat. Off. | 59/5 |
| 48-9645 | 3/1973 | Japan . | |
| 60-18850 | 5/1985 | Japan . | |
| 796508 | 1/1981 | U.S.S.R. | 384/283 |
| 174535 | 2/1922 | United Kingdom | 29/898.1 |
| 261292 | 11/1926 | United Kingdom . | |
| 552235 | 3/1943 | United Kingdom . | |

*Primary Examiner*—David Jones
*Attorney, Agent, or Firm*—Armstrong, Westerman, Hattori, McLeland & Naughton

[57] ABSTRACT

The present invention improves accuracy in the axial dimension of rolled parts for a chain such as bushings, rollers and similar. A rolled part is manufactured by cutting a strip of steel into a rectangular shape to obtain a rectangular base material having a predetermined dimension, The rectangular base material is rolled into a clindrical shape to obtain a cylindrically formed part having cut end surfaces face each other. A core is inserted for rolling the rectangular base material into the cylindrically formed part. The cylindrically formed part is then pressed through a die having a circular opening. The rolled part has a plurality of blind grooves on a surface thereof. While the cylindrically formed part is being pressed through the die having a circular opening, a plastic flow of the material of the cylindrically formed part intensively occurs in a direction toward the blind grooves. Since the plastic deformation of the rolled part is absorbed by the blind grooves, axial dimension of the rolled part hardly varies,

4 Claims, 7 Drawing Sheets

ROLLED PART FOR CHAIN AND MANUFACTURING METHOD THEREFOR

FIELD OF THE INVENTION

The present invention relates to a rolled part suited for use as a component part of a chain, namely a bushing fitted into inner plates, a roller through which the bushing is passed, or a bushing which is fitted into a roller. The invention also relates to a method of manufacturing the rolled part.

BACKGROUND OF THE INVENTION

Figure 13:
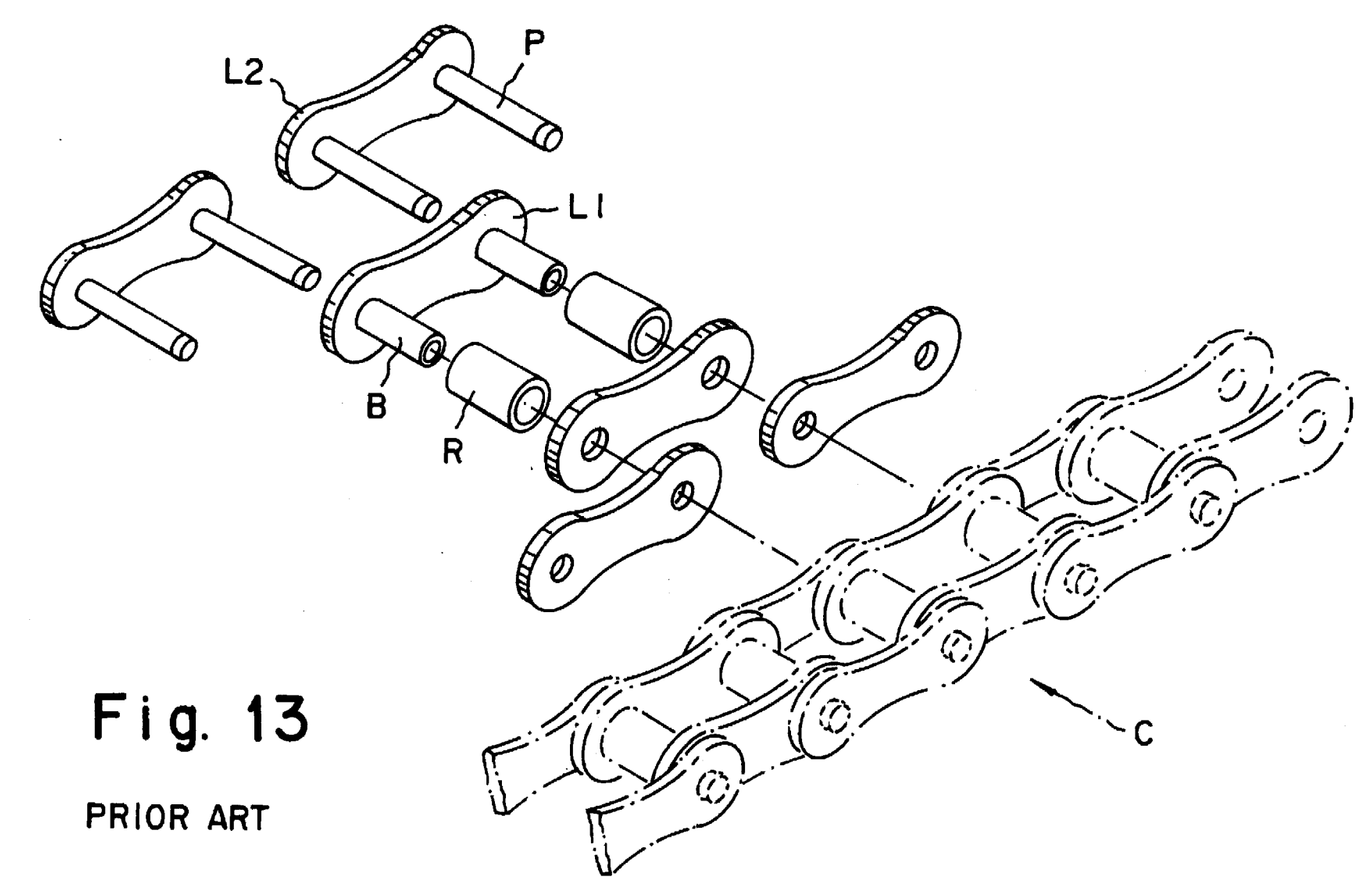
FIG. 13 is an exploded perspective view showing the development of a rolled part according to a still further embodiment of the invention.

FIG. 13 is an exploded perspective view of a prior art chain C. Chain C of this kind includes inner plates L1, outer plates L2, bushings B press-fitted into the inner plates L1, pins P press-fitted into the outer plates and passed through the bushings B, and rollers R which are located between the inner plates L1 and through which the bushings B are passed. A lubricant is applied at sliding portions between the pin P and the bushing B and between the bushing B and the roller R. In some cases, a roller into which a bushing is fitted may be used in place of the roller R.

Of the component parts of the chain, for example, the bushing B has a cylindrical shape and is manufactured, in many cases, by rolling a rectangular base material which is made by cutting a strip of steel with a forming machine or similar. Japanese Examined Patent Application Publication No. 60-18850 discloses a method manufacturing such a bushing B by a rolling process. According to this method, a rectangular base material is formed into a cylindrical part, which is then pressed through a die having a circular opening for improving roundness and other dimensional accuracies In the method described above, however, when the cylindrically formed part is pressed through the die having a circular opening, the part deforms due to a plastic flow of the material thereof. Since the cylindrically formed part is pressed between the die and a core for rolling, the plastic flow of the material occurs in the axial direction of the cylindrically formed part. Thus, the formed product, i.e., a rolled part, has a deteriorated dimensional accuracy in the axial direction thereof due to the plastic deformation thereof.

For example, when the above-described rolled parts are used as bushings for a chain and assembled, together with inner plates, into inner link assemblies for the chain using the axial dimension of the bushing as a reference, thus assembled inner link assemblies show dispersion in the outer width thereof.

If the outside width of an inner link assembly decreases, the spacing between the outer plate and the inner plate increases. As a result, lubricant present between the pin and the bushing oozes out, causing the lubricating performance of the chain to deteriorate. Also, the spacing causes noise to occur and strength of the chain to deteriorate.

On the other hand, if the outside width of an inner link assembly becomes increased, there is no space between the outer plate and the inner plate which prevents the chain from bending.

In some cases, the inner link assembly is assembled using the outside width thereof as a reference. In these cases, if the axial dimension of the bushing decreases, the fitting area of the bushing being fitted into the inner plate is decreased, thereby causing the fatigue strength of the inner link assembly to decrease due to a decreasing fitting force. On the other hand, if the axial dimension of the bushing becomes increased, the portion of the bushing projecting outwardly from the outer face of the inner plate rubs against an outer plate, so that wear particles are generated. This results in a shorter service life of the chain.

Also when the above-described rolled parts are used as rollers or bushings fitted into rollers, due to dispersion in their axial dimension, lubricating performance deteriorates and the service life of the chain shortens. Accordingly, when the rolled parts are to be used as bushings or the like of a chain, it is necessary to maintain their axial dimensions at a proper accuracy.

An object of the present invention is to concentrate a plastic deformation of a rolled part at predetermined portions thereof during a process of pressing the rolled part through a die having a circular opening, thereby improving accuracy of the axial dimension thereof after the pressing process.

Another object of the present invention is to use the above-described roller part as a component part of a chain, namely, a bushing press-fitted into inner plates, a roller through which the bushing is passed, or a bushing fitted into a roller, thereby improving the lubricating performance, strength and service life of the chain.

A further object of the present invention is to provide a method of manufacturing the above-described rolled part,

SUMMARY OF THE INVENTION

To solve the above-mentioned problems, the present invention provides rolled part for a chain which is manufactured by rolling a rectangular base material and pressing the rolled rectangular base material through a die having a circular opening. A plurality of blind grooves are formed on a surface of the rolled material for absorbing a plastic deformation thereof while being pressed through the die having a circular opening.

When a cylindrically formed part, which is a semi-finished form of rolled part according to the present invention, enters and leaves a die having a circular opening, a plastic flow of the material of the cylindrically formed part occurs in a direction toward blind grooves formed on a surface of the rolled part. The blind groove is a groove which does not extend all the way to ends of the cylindrically formed part or the rolled part.

As described above, as a result of absorbing a plastic deformation of the material at specific portions of the cylindrically formed part, i.e., the blind grooves, the axial dimension of the rolled part hardly changes, resulting in better dimensional accuracy.

Since grooves in the rolled part are closed without extending to the ends thereof, the rolled part provides a higher performance of holding lubricant therein. A chain using the rolled therefore exhibits a better lubricating performance.

The rolled part as described above is suited for use as a component part of a chain, namely, a bushing press-fitted into inner plates, a roller through which a bushing is passed, or a bushing fitted into a roller. Such an application further improves the lubricating performance of the chain.

For example, when the rolled part is used as a bushing press-fitted into inner plates, blind grooves are formed on at least one of the inner or outer surfaces thereof. This structure allows blind grooves to form pockets for lubricant between the inner surface of the bushing and the outer surface of a pin and between the outer surface of the bushing and the inner surface of a roller, thereby improving the performance of holding lubricant therebetween.

Also for example, when the rolled part is used as a roller through which a bushing is passed, blind grooves are formed on the inner surface thereof. This structure allows the blind grooves to form pockets for lubricant between the outer surface of the bushing and the inner surface of the roller, thereby improving the performance of holding lubricant therebetween.

When the rolled part is used as a bushing fitted into a roller, blind grooves are formed on the inner surface thereof. The bushing fitted into a roller slides on a bushing press-fitted into inner plates or a pin press-fitted into outer plates. This structure allows the blind grooves to form pockets for lubricant between the inner surface of the bushing fitted into a roller and the outer surface of the bushing press-fitted into the outer plates or of the pin, thereby improving the performance of holding lubricant therebetween.

The rolled part of the present invention is manufactured by the following procedure. First, there is prepared a strip of steel having a plurality of blind grooves which are located a predetermined distance from side edges thereof. The blind grooves are formed in advance on the strip steel by roll-forming or similar. The strip steel is cut into a rectangular shape to obtain a rectangular base material. The rectangular base material is formed into a cylindrical part by means of a forming machine or similar so that its cut end surfaces face each other. A core for rolling is inserted into the cylindrically formed part, which is then pressed through a die having a circular opening. While the cylindrically formed part is passing through the die, a plastic flow of the cylindrically formed parts material occurs. The plastic flow intensively occurs in a direction towards the blind grooves. Accordingly, the rolled part does not suffer large variations in its axial dimension.

DETAILED DESCRIPTION OF THE INVENTION

Embodiments of the present invention will now be described with reference to the drawings. FIGS. 1 to 5 show a first embodiment of a rolled part according to the present invention. In the first embodiment, the rolled part is used as a bushing press-fitted into inner plates. A rolled part 24 is manufactured by the steps of cutting a strip of steel 10 into a rectangular shape to obtain a rectangular base material 12 having a predetermined length, forming the rectangular base material 12 into a cylindrical shape to obtain a cylindrically formed part by means of forming machine or similar, inserting a core for rolling the rectangular base material 12 into the cylindrically formed part 16, and pressing the cylindrically formed part 16 through a die 20 having a circular opening.

Figure 1:
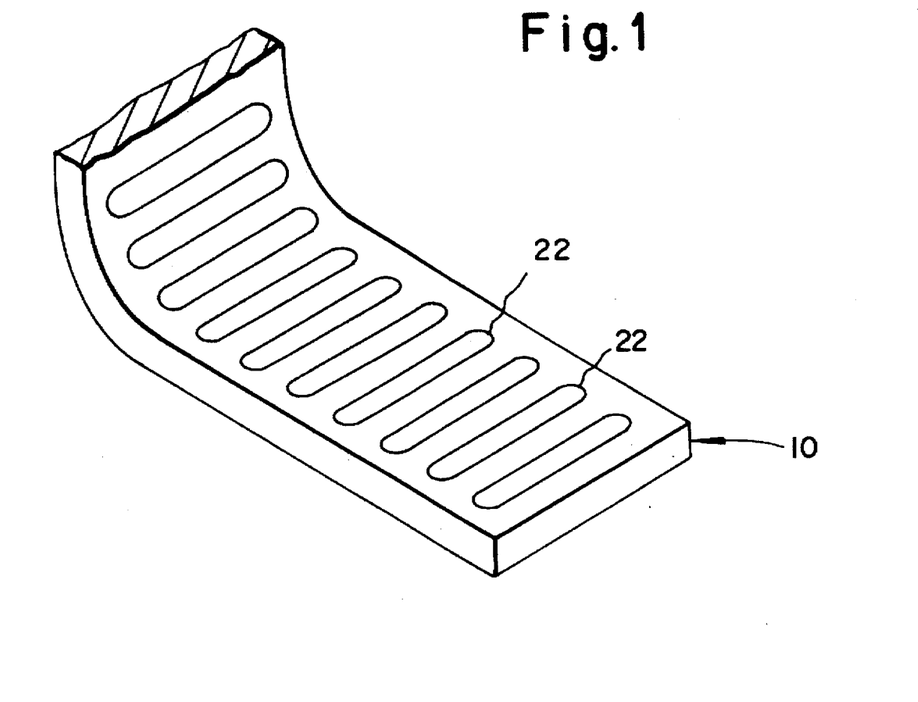
FIG. 1 is a perspective view of a strip steel used as material for a rolled part according to the present invention.
Figure 2:
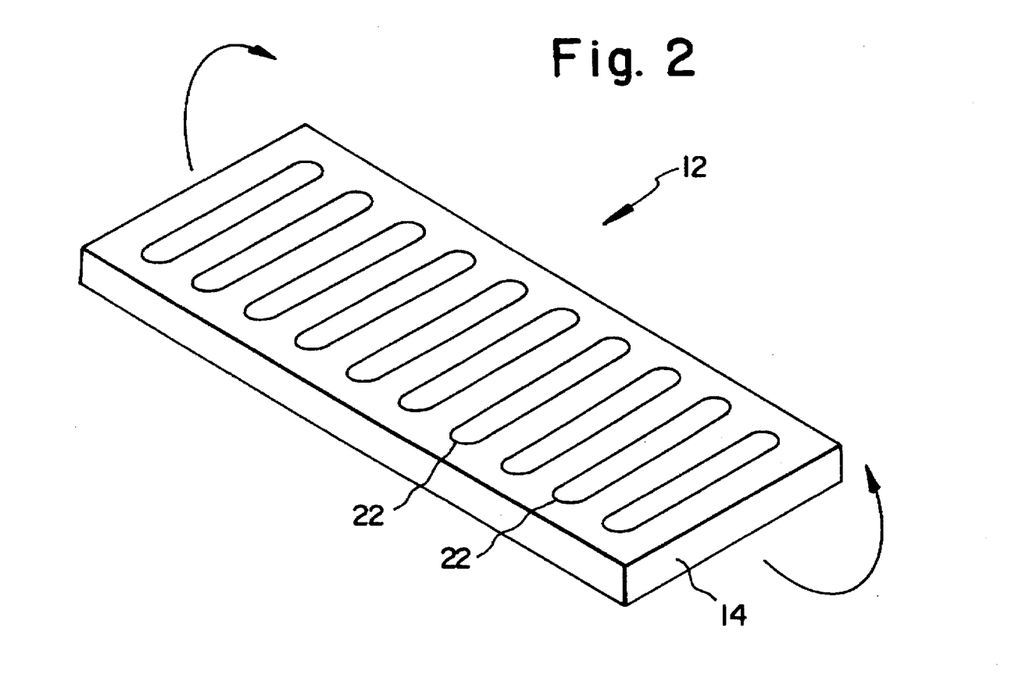
FIG. 2 is a perspective view of a rectangular base material obtained by cutting the strip steel of FIG. 1 in predetermined dimensions.
Figure 3:
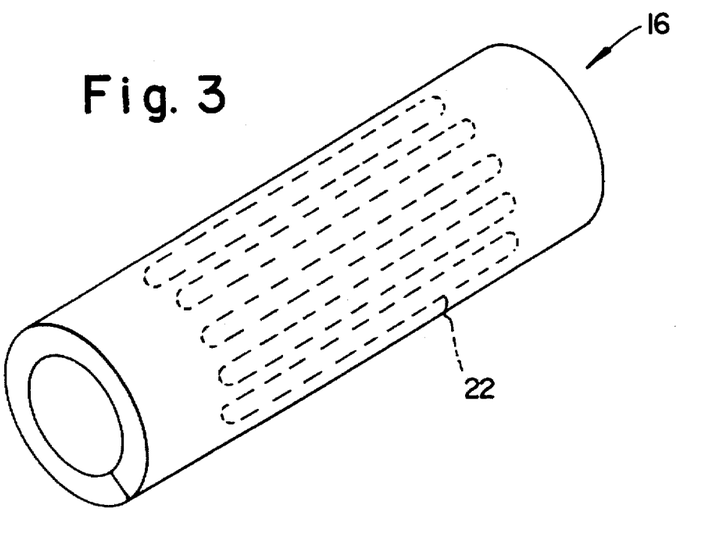
FIG. 3 is a perspective view of a cylindrically formed part obtained by rolling the rectangular base material of FIG. 2.

The strip of steel 10 has blind grooves 22 formed on either face thereof. The blind grooves 22, according to the first embodiment of the present invention, extend in the width direction of the strip of steel 10. The blind grooves 22, however, do not extend all the way to the side edges of the strip of steel 10. The blind grooves 22 are arranged in parallel with each other.

Figure 4:
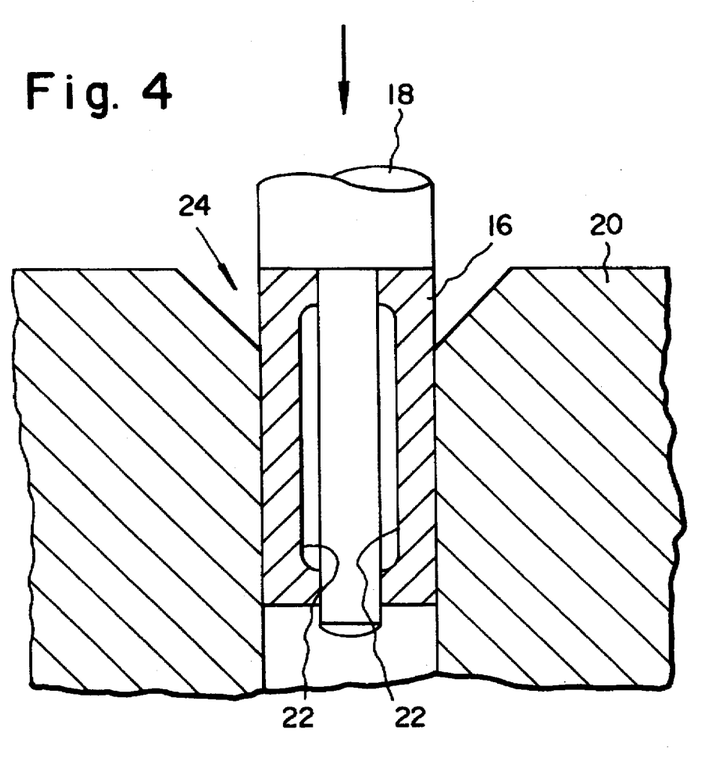
FIG. 4 is a cross-sectional view showing steps of inserting a core for rolling into a cylindrically formed part of FIG. 3 and pressing the cylindrically formed part through a die having a circular opening.

When the cylindrically formed part 16 is pressed through the die 20 having a circular opening as shown in FIG. 4, a plastic flow occurs in the material of the cylindrically formed part 16. The plastic flow intensively occurs in a direction toward the blind grooves 22. Accordingly, the blind grooves 22 absorb a plastic deformation of the material during pressing of the circularly formed part 16 through the die 20 having a circular opening, whereby the rolled part 24 hardly suffers any variations in its axial dimension.

Further, in the rolled part 24 of the present invention, the blind grooves 22 do not extend to the ends thereof. If grooves are provided extending to the ends of the cylindrically formed part a plastic deformation reaches the ends without being absorbed by the grooves, thus causing the end portions to become rugged in the axial direction of the cylindrically formed part 16. The resultant rolled part 24 has a poorer dimensional accuracy in the axial direction thereof. It is therefore important not to extend grooves to the ends of the cylindrically formed part 16.

Figure 5:
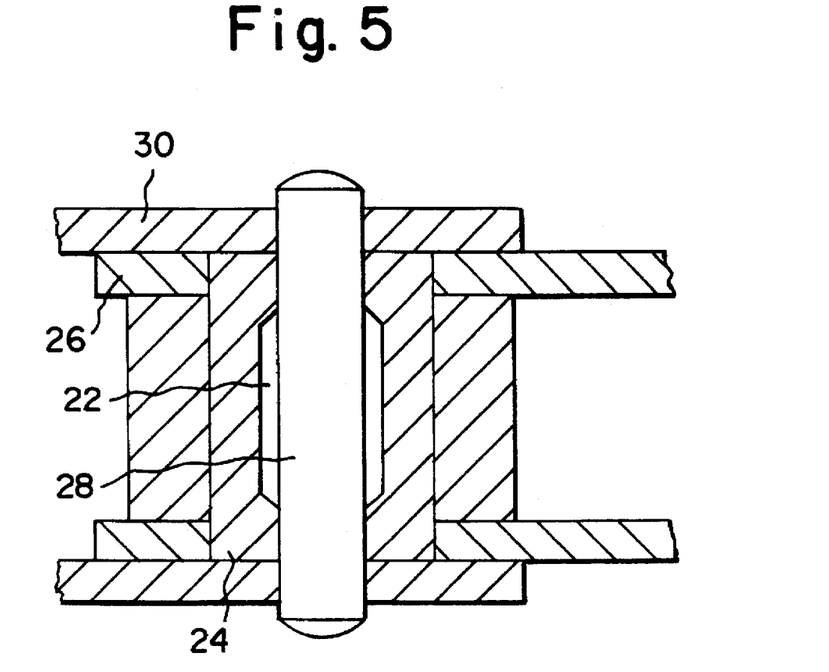
FIG. 5 is a cross-sectional view showing part of a chain which uses the rolled part of FIG. 4 as a bushing thereof.

As shown in FIG. 5, the bushing 24 is press-fitted into inner plates 26, and a pin 28 is inserted through the bushing 24 to form a chain. By using the rolled part of the present invention as the bushing, the bushing exhibits an improved dimensional accuracy in the axial direction thereof. Thus, it is possible to properly maintain the dimension between the inner plates 26 and the spacing between the inner plate 26 and an outer plate 30. Also, the bushing 24 is properly press-fitted into the inner plates 26 without failing to extend all the way across the width of the inner plate 26 or without projecting beyond the inner plate 26. This maintains a required strength of the chain as a whole and prevents components of the chain from wearing. This chain structure does not necessarily require rollers.

In order for a plastic flow of the material of the rolled part to occur toward the blind grooves 22, it is important for the blind grooves 22 to account for a larger portion of the total surface area of the rectangular base material 12, in addition to the feature that grooves do not extend to the side edges of the material. In the rolled part 24 according to the first embodiment of the present invention, the blind grooves 22 having the same length are arranged in the longitudinal direction of the strip of steel 10, thereby maximizing the area occupied by the blind grooves 22. This arrangement is effective for concentrating a plastic flow of the material toward the blind grooves 22. Also, since the closed grooves 22 according to the first embodiment of the present invention have a simple shape, the closed grooves 22 can be easily formed on the strip of steel 10 by roll forming.

Figure 6:
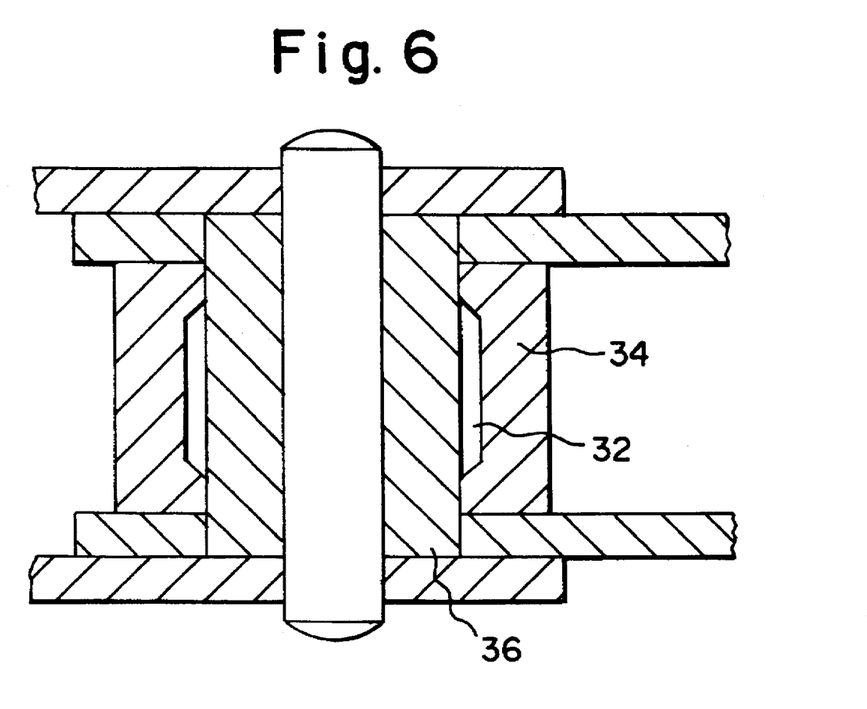
FIG. 6 is a cross-sectional view showing part of a chain which uses the rolled part of the present invention as a roller thereof.
Figure 7:
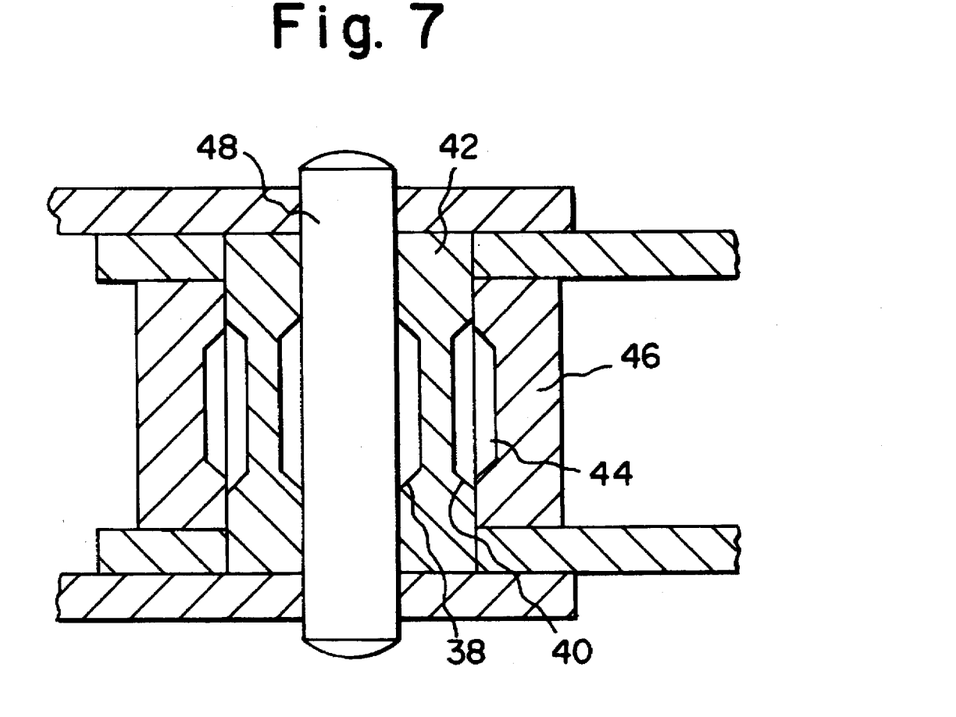
FIG. 7 is a cross-sectional view showing part of a chain which uses the rolled part of the present invention as a bushing and a roller thereof.
Figure 8:
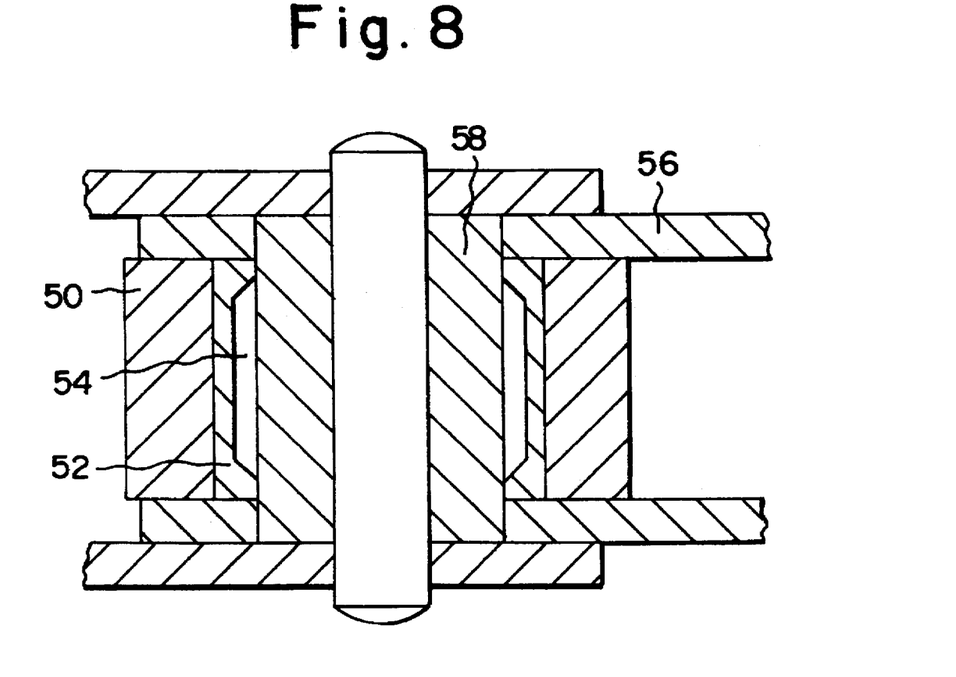
FIG. 8 is a cross-sectional view showing part of a chain which uses the rolled part of the present invention as a bushing fitted into a roller thereof.
Figure 9:
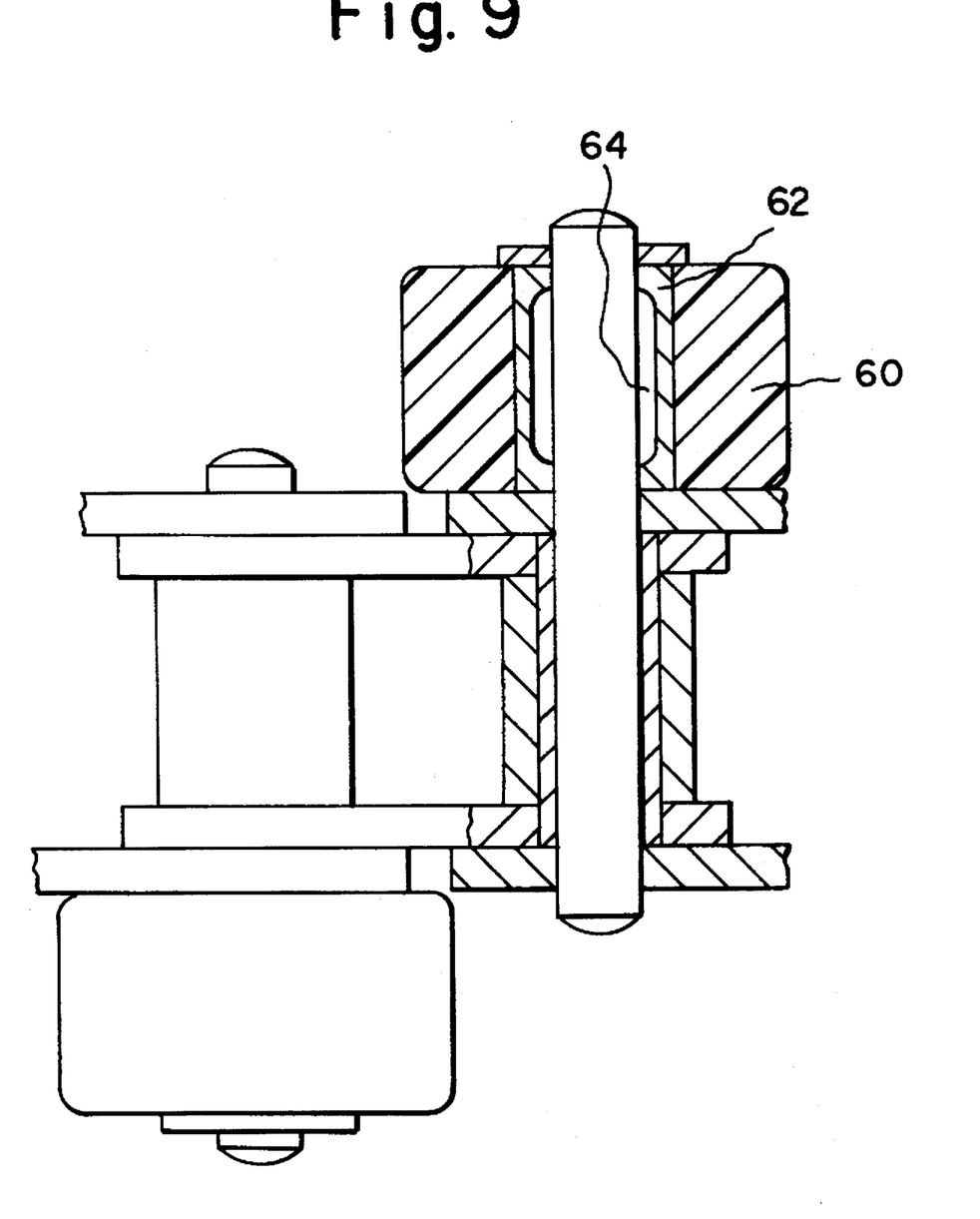
FIG. 9 is a cross-sectional view showing part of another chain which use the rolled part of the present invention as a bushing fitted into a roller thereof.

FIGS 6 to 9 show other embodiments of the present invention. In FIGS. 6 and 7, the rolled parts according to a second embodiment of the present invention are used as a roller and a bushing of a roller chain. In FIGS. 8 and 9, the rolled parts according to a third embodiment of the present invention are used as a bushing fitted in to a roller.

FIG. 6 shows a roller 34 having a plurality of blind grooves 32 in the inner surface thereof, Pockets for lubricant are formed between the sliding surfaces of a bushing 36 and the roller FIG. 7 shows a bushing %2 having a plurality of blind grooves 38 and 40 in both of the inner and outer surfaces thereof and a roller 46 having a plurality of blind grooves 44 in the inner surface thereof. Pockets for lubricant are formed between the sliding surfaces of the bushing 42 and the pin 48 and between the sliding surfaces of the bushing 42 and the roller 46.

FIG. 8 shows the third embodiment having a bushing 52 fitted into a roller 50 which has blind grooves 54 in the inner surface thereof. Pockets for lubricant are formed between the sliding surfaces of a bushing 58 press-fitted into inner plates 56 and the bushing 52.

FIG. 9 shows the third embodiment of the rolled part of the present invention which is used in a side roller chain, which is a typical accumulate conveyor chain. Blind grooves 64 are formed on the inner surface of a bushing 62 fitted into a side roller 60 made of resin. In some cases, blind grooves are formed in bushings which are fitted into rollers made of resin provided in a center roller chain or a top roller chain.

Figure 10:
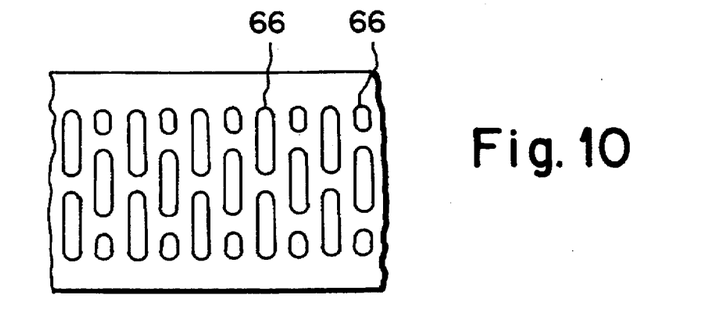
FIG. 10 is a perspective view showing the development of a rolled part according to another embodiment of the present invention.
Figure 11:
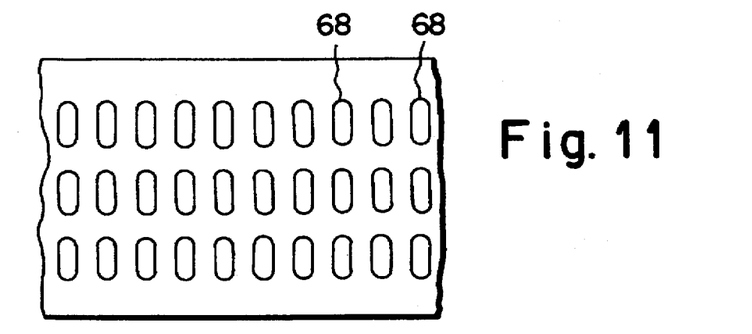
FIG. 11 is a perspective view showing the development of a rolled part according to still another embodiment of the present invention.
Figure 12:
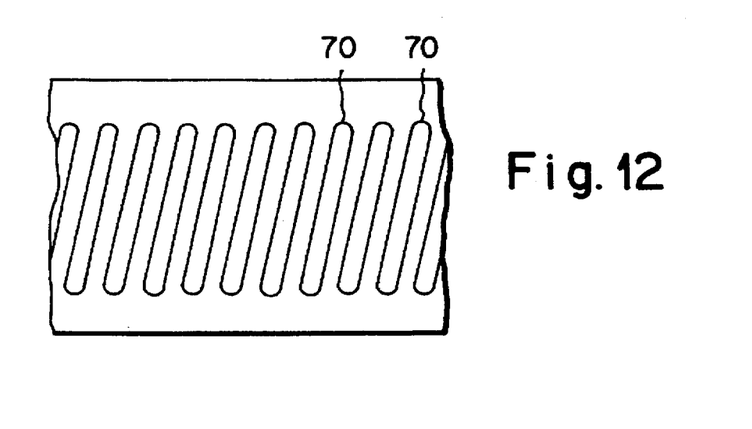
FIG. 12 is a perspective view of a chain to which a rolled part, according to the present invention, is applied.

FIGS. 10 to 12 are developments of the die-processed cylindrically formed parts according to further embodiments of the present invention. They are different from each other in the shape of blind grooves.

In the rolled part of FIG. 10, blind grooves 66 are arranged in a staggered manner. This arrangement provides a rolled part formed cylindrically from a rectangular base material with a larger shear strength in its radial direction. The rolled part according to the present embodiment is suited for use as a roller of a chain engaging with a sprocket. Fragmented blind grooves 66 provide better performance of holding lubricant therein.

The rolled part of FIG. 11 corresponds to that of FIG. 1, but each of the blind grooves shown in FIG. 1 is divided into smaller blind grooves. As in the embodiment of FIG. 10, the fragmented blind grooves 68 provide better performance of holding lubricant therein. Also, it is easy to manufacture a roll used for forming the blind grooves 68.

The rolled part of FIG. 12 corresponds to that of FIG. 1, but blind grooves 70 are inclined. This arrangement of the blind grooves 70 is effective for absorbing a plastic deformation of the material of the rolled part, thereby minimizing variations in the axial dimension thereof. Also, on the occurrence of a crack, if any, in the rolled part, the present embodiment exhibits a greater rupture strength than the embodiments described previously because a cracking direction (axial direction of the rolled part) differs from the elongating direction of the blind grooves 70.

Since the rolled part of the invention has a plurality of blind grooves, a plastic deformation of the material thereof occurs toward the blind grooves while a semi-finished part therefor is being pressed through a die having a circular opening. This decrease variations in the axial length of the rolled parts and dispersion in the axial dimension thereof. Further, since grooves do not end to the axial ends of the rolled part, the higher performance of holding lubricant therein results. This allows the rolled part used as a component part of a chain to provide a better lubricating performance.

According to the invention of claim 2, the rolled part is used as a bushing for a chain. In this case, blind grooves are formed on the surface of the bushing which slides on a pin or on a roller, whereby the blind grooves function as pockets for lubricant. This improves the performance of holding lubricant between the bushing and the pin or between the bushing and the roller, resulting in an improved wear resistance of the bushing and the roller.

According to the invention of claim 3, the rolled part is used as a roller through which a bushing is passed. In this case, blind grooves are formed on the surface of the roller which slides on the bushing, whereby the blind grooves function as pockets for lubricant. This improves the performance of holding lubricant between the roller and the bushing, resulting in an improved wear resistance of the bushing and the roller.

According to the invention of claim 4, the rolled part is used as a bushing press-fitted into a roller. In this case, blind grooves are formed on the surface of the bushing which slides on a pin or on a bushing press-fitted into inner plates, whereby the blind grooves function as pockets for lubricant. This improves the performance of holding lubricant between the bushing and the pin or between the bushing and the hushing press-fitted into inner plates, resulting in an improved wear resistance of the bushings and the pin.

According to the invention of claim 5, a strip of steel having a plurality of blind grooves which are formed at a position located a predetermined distance from side edges thereof is used as the material of a rectangular base material which is rolled into a cylindrical part, which is then pressed through a die having a circular opening. Thus, a plastic deformation of the cylindrically formed part mostly occurs in directions toward the blind grooves, so that no large variation occurs in the axial dimension of the rolled part. Therefore, it is possible to manufacture rolled parts having an increased dimensional accuracy.

DESCRIPTION OF SYMBOLS

10: strip of steel
12: rectangular base material
16: cylindrically formed part
18: core for rolling
20: die having a circular opening
22, 32, 38, 40, 44, 56, 68, 70: blind groove
24: rolled part

What is claimed is:
1. A transmission type chain comprising:
   a plurality of outer link assemblies, wherein each outer link assembly of said plurality of outer link assemblies includes:
      two outer plates juxtaposed with respect to each other; and
      two pins press-fitted into each of said two outer plates at both first and second opposing ends of said outer plate; and
   a plurality of inner link assemblies, wherein each inner link assembly of said plurality of inner link assemblies includes:

two inner plates juxtaposed with respect to each other; and two bushings press-fitted into each of said two inner plates at both first and second opposing ends thereof, wherein said pins of said outer link assemblies are passed through said bushings, and each of said bushing is a cylindrical hollow member having an inner cylindrical wall and an outer cylindrical wall and any one of said inner wall and said outer wall of said bushing having both a plurality of blind grooves formed in a central portion thereof and an ungrooved margin formed along an outer periphery thereof, a thickness of said inner plate being wider than a width of said ungrooved margin, whereby said bushing being press-fitted into said inner plates without applying shearing force when said transmission type chain is propelled.

2. The transmission type chain according to claim 1, wherein each of said inner link assemblies includes a roller surrounding said bushing between said inner plates, said bushing having a plurality of blind grooves on said outer wall thereof, a width of said blind grooves being shorter than a width of said roller, thereby forming pockets for lubricant between said bushing and said roller.

3. The transmission type chain according to claim 2, wherein each of said rollers has a plurality of blind grooves formed in a central portion thereof and an ungrooved margin formed along an outer periphery thereof, a width of said blind grooves of said roller being shorter than a width of said blind grooves of said bushing.

4. A method of manufacturing a rolled part for a transmission type chain, comprising the steps of:

cutting a strip of steel into a rectangular shape having first and second end walls, first and second side walls and top and bottom walls;

forming a plurality of blind grooves into a central portion of an upper surface of any one of said top and bottom wall so that an ungrooved margin is formed around an outer periphery of any one of said top and bottom walls, respectively;

rolling said strip of steel with said blind grooves into a cylindrical shape so that said first end wall contacts said second end wall to form a rolled strip of steel; and pressing said rolled strip of steel through a circular opening of a die to form a hollow cylindrical tube having plastically deformed blind grooves.

* * * * *